United States Patent
MacDonald

(10) Patent No.: US 8,033,454 B2
(45) Date of Patent: Oct. 11, 2011

(54) SELF-SERVICE TERMINAL

(75) Inventor: Alexander S. MacDonald, Dundee (GB)

(73) Assignee: NCR Corporation, Duluth, GA (US)

( * ) Notice: Subject to any disclaimer, the term of this patent is extended or adjusted under 35 U.S.C. 154(b) by 924 days.

(21) Appl. No.: 12/012,165

(22) Filed: Jan. 31, 2008

(65) Prior Publication Data

US 2009/0195992 A1 Aug. 6, 2009

(51) Int. Cl.
- *G06Q 40/00* (2006.01)
- *G07D 11/00* (2006.01)
- *G07F 19/00* (2006.01)

(52) U.S. Cl. .......... 235/379; 235/381; 235/486; 705/43; 902/8; 902/17; 902/22

(58) Field of Classification Search ................ 235/379, 235/380, 383, 381; 705/39–45; 902/8, 17, 902/18, 22; 361/724

See application file for complete search history.

(56) References Cited

U.S. PATENT DOCUMENTS

| | | | | |
|---|---|---|---|---|
| 5,202,549 A | * | 4/1993 | Decker et al. | 235/379 |
| 5,642,922 A | * | 7/1997 | Ramachandran et al. | 312/7.2 |
| 7,004,383 B2 | * | 2/2006 | Graef et al. | 235/379 |
| 7,195,172 B1 | * | 3/2007 | Scarafile et al. | 235/486 |
| 7,347,368 B1 | * | 3/2008 | Gravelle et al. | 235/384 |
| 7,545,960 B2 | * | 6/2009 | Coutts | 382/115 |
| 2004/0178559 A1 | * | 9/2004 | Harty et al. | 271/113 |

* cited by examiner

*Primary Examiner* — Thien M Le
*Assistant Examiner* — Tuyen Vo
(74) *Attorney, Agent, or Firm* — Michael Chan

(57) ABSTRACT

A self-service terminal comprises a fascia defining an aperture through which a receipt or other type of media items is dispensible to a customer. The fascia comprises a protrusion located immediately beneath the aperture in a generally central location. The protrusion comprises a lower surface against which a customer's finger may rest and an upper surface for guiding an exiting receipt or other type of media item. The protrusion extends outwardly from the fascia to ensure that even if the customer places a finger on the protrusion, opposing edges of the receipt or other media item exit a sufficient distance from the aperture to allow the receipt or other media item to be visible to and removed by the customer.

10 Claims, 3 Drawing Sheets

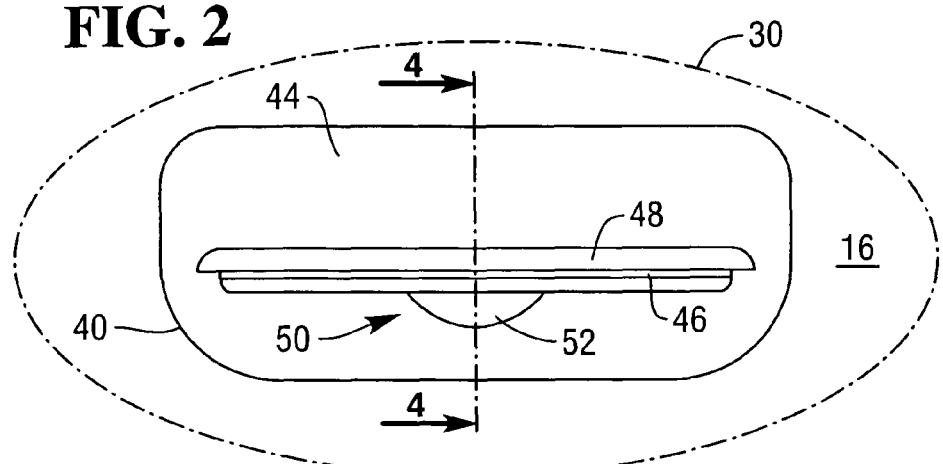
FIG. 2
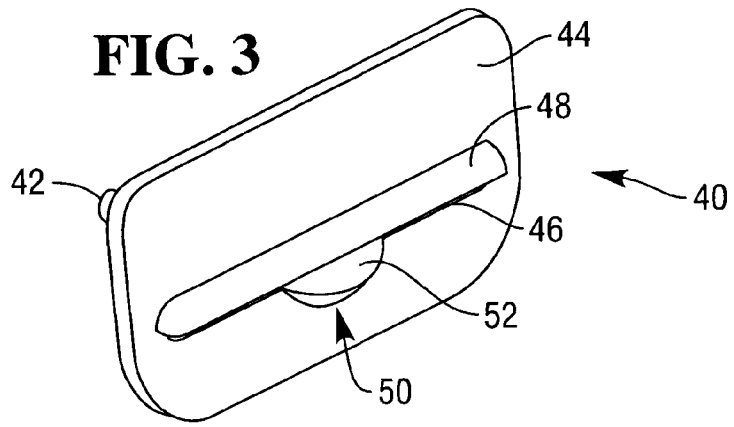
FIG. 3
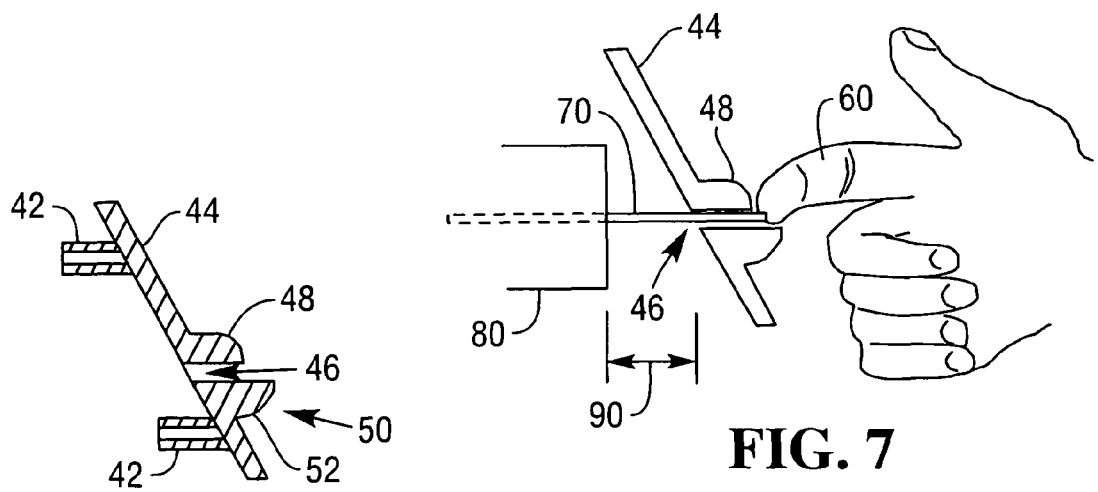
FIG. 4
FIG. 7

SELF-SERVICE TERMINAL

FIELD OF INVENTION

The present invention relates to a self-service terminal. In particular, though not exclusively, the invention relates to an automated teller machine (ATM).

BACKGROUND OF INVENTION

Many ATMs are located in an unattended environment. As a result, the ATM must be able to ensure that it remains in operation without any intervention from a user of the ATM. Any hardware or software problems may cause the ATM to require a visit from an ATM technician to restore such an ATM to normal operation. These ATM technician visits are expensive for the ATM owner and introduce an extended time period during which the ATM cannot be used by ATM customers desiring to execute transactions at that ATM. ATM technician visits are therefore expensive and undesirable.

One recurring cause of ATM failure is jamming of receipt paper resulting from a customer blocking a receipt exit aperture (also called a slot) with his/her finger while waiting for a receipt to be dispensed. Although this problem may appear to be trivial, it is very expensive and time consuming to resolve.

SUMMARY OF INVENTION

Accordingly, the invention generally provides methods and apparatus for ensuring that a self-service customer does not block a receipt aperture prior to receiving a receipt from the self-service terminal; or if the customer does block part of the receipt aperture, for increasing the possibility that the receipt may still be retrieved by the customer.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising a fascia defining an aperture through which a receipt is dispensed to a customer, the fascia comprising a protrusion located immediately beneath the aperture in a generally central location, the protrusion comprising a lower surface against which a customer's finger may rest and an upper surface for guiding an exiting receipt, the protrusion extending outwards from the fascia to ensure that even if the customer places a finger on the protrusion, opposing edges of the receipt exit a sufficient distance from the aperture to allow the receipt to be removed by the customer.

The protrusion may have a generally arcuate lower surface.

The protrusion may provide a sloping upper surface and a curved lower surface.

The fascia may further comprise a canopy defined above the aperture and arranged to reduce ingress of debris, precipitation, and the like into the aperture.

The canopy and protrusion may be arranged such that opposing edges of an exiting receipt are visible even if a customer's finger is located above the protrusion.

The receipt may be a slip of paper or any other convenient media type.

By virtue of this aspect, a protrusion is provided that functions as a guide on which a customer naturally rests his/her finger. The protrusion is dimensioned to ensure that when a customer's finger is resting thereon, there is sufficient clearance for a receipt to be dispensed from the aperture without being blocked by the customer's finger. This avoids receipts backing up behind the fascia and jamming the receipt printer, thereby causing the self-service terminal to go out of service and requiring a visit from an ATM technician to reinstate the ATM to full working order.

The self-service terminal may be an automated teller machine (ATM), information kiosk, financial services centre, bill payment kiosk, lottery kiosk, postal services machine, check-in and/or check-out terminal such as those used in the hotel, car rental, healthcare, and airline industries, a retail self-checkout terminal, a vending machine, or the like.

According to a second aspect there is provided an insert for a self-service terminal fascia, the insert defining an aperture through which a receipt is dispensed to a customer, the insert comprising a protrusion located immediately beneath the aperture in a generally central location, the protrusion comprising a lower surface against which a customer's finger may rest and an upper surface for guiding an exiting receipt, the protrusion extending outwards from the insert to ensure that even if the customer places a finger on the protrusion, opposing edges of the receipt exit a sufficient distance from the aperture to allow the receipt to be removed by the customer.

The insert may be molded from plastics material.

According to a third aspect there is provided a self-service terminal comprising a fascia defining an aperture through which a media item is dispensed to a customer, the fascia comprising a protrusion located immediately beneath the aperture in a generally central location, the protrusion comprising a lower surface against which a customer's finger may rest and an upper surface for guiding an exiting media item, the protrusion extending outwards from the fascia to ensure that even if the customer places a finger on the protrusion, opposing edges of the media item exit a sufficient distance from the aperture to allow the media item to be removed by the customer.

According to a fourth aspect there is provided a self-service terminal fascia defining an aperture in which may be mounted an insert according to the second aspect.

These and other aspects will be apparent from the following specific description, given by way of example, with reference to the accompanying drawings.

BRIEF DESCRIPTION OF THE DRAWINGS

FIG. 2 is a pictorial elevation view showing a part (the receipt printer slot insert) of FIG. 1 in more detail;

FIG. 3 is a pictorial perspective view showing the receipt printer slot insert of FIG. 2;

FIG. 4 is a cross-sectional side view showing the receipt printer slot insert of FIG. 2;

FIG. 7 is a side view of the receipt printer slot when used incorrectly by a customer.

DETAILED DESCRIPTION

Figure 1:
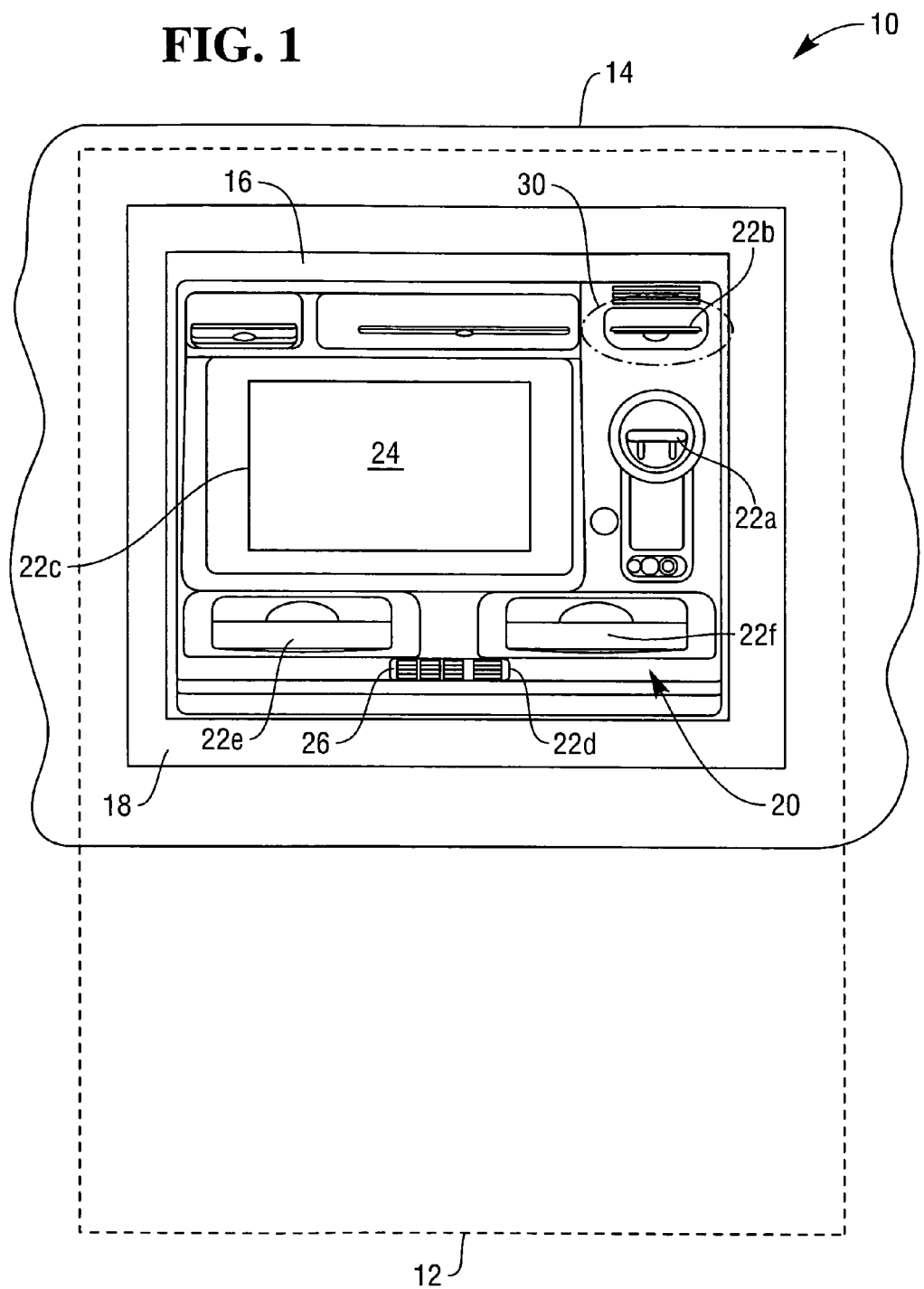
FIG. 1 is a pictorial front view of a self-service terminal (in the form of an ATM) according to one embodiment of the present invention.

Reference is first made to FIG. 1, which is a pictorial front view of a self-service terminal 10, in the form of a through-the-wall (TTW) ATM, according to one embodiment of the invention.

The ATM 10 has a chassis 12 (shown in dotted line) protruding in part through an aperture in a wall 14, and on which is mounted a plastic fascia 16 sealed to the wall 14 by a collar 18.

The ATM 10 is a rear access ATM having an access door (not shown) hingeably coupled to the rear of the chassis 12. When the door (not shown) is swung open, an operator can gain access to devices (not shown) located within the ATM 10.

The fascia 16 provides part of a user interface 20 to allow a customer to interact with the ATM 10. In particular, the fascia 16 has apertures 22 (or slots) aligning with internal devices (not shown).

The fascia 16 defines: a card reader slot 22a aligning with a card reader device 18a; a receipt printer slot 22b aligning with a receipt printer device located behind the fascia 16; a display aperture 22c through which a display 24 protrudes; a keypad aperture 22d through which an encrypting keypad device 26 protrudes; a deposit slot 22e (closed by a shutter when not being used) aligning with a depository (not shown); and a dispenser slot 22f (closed by a shutter when not being used) aligning with a dispenser device (not shown).

The area around receipt printer slot 22b (shown by ellipse 30) will now be described in more detail, with reference to FIGS. 2 to 4, which are pictorial elevation, perspective, and side views respectively of the area within ellipse 30.

Ellipse 30 shows part of the fascia 16 that includes a receipt printer slot insert 40. The insert 40 is a molded plastic component having rear tubular fixings 42 (best seen in FIG. 4) for coupling to complementary formations in the fascia 16.

The insert 40 has a sloping front surface 44 matching a slope on the front surface of the fascia 16. The insert 40 defines a slot 22b through which receipt paper can be dispensed. The insert 40 also defines a canopy 48 directly above, and protruding over, the receipt printer slot 22b to prevent ingress of precipitation, dust, debris, and the like via the slot 22b.

The insert 40 also defines a protrusion 50 immediately below the slot 22b and extending outwardly from the insert 40. The protrusion 50 comprises an arcuate lower surface 52 against which a customer's finger may rest, and a flat upper surface 54 for guiding receipt paper as it exits from the receipt printer slot 22b.

Figure 5:
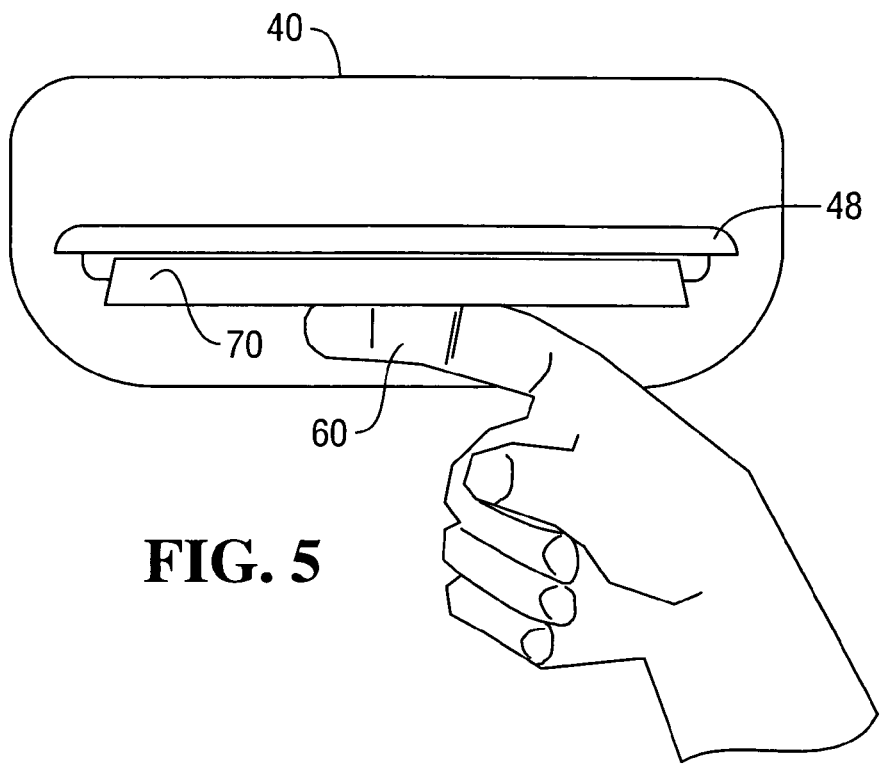
FIG. 5 illustrates a customer using the receipt printer slot insert of FIG. 2 correctly.
Figure 6:
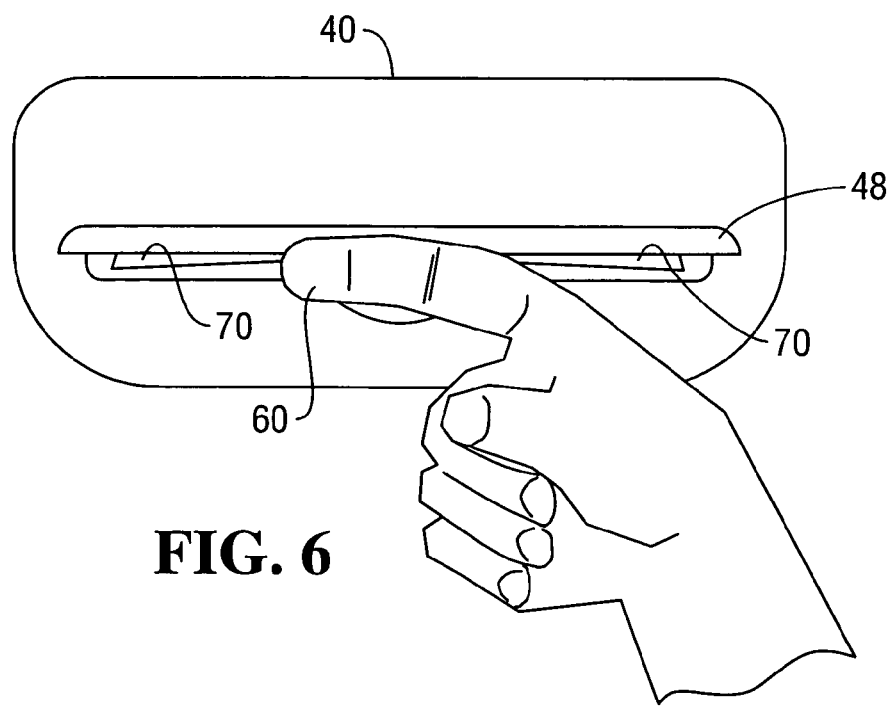
FIG. 6 illustrates a customer using the receipt printer slot insert of FIG. 2 incorrectly.

Reference will now be made to FIGS. 5 to 7, which illustrate a customer's finger in proximity to the insert 40 when the insert 40 is mounted on the fascia 16.

As shown in FIG. 5, when a customer places his/her finger 60 on the lower surface 52, a receipt 70 can be delivered from a receipt printer 80 (shown in FIG. 7) and easily retrieved by the customer.

As shown in FIGS. 6 and 7, even if a customer places his/her finger 60 on the upper surface 54, thereby blocking the central part of the receipt printer slot 22b, the edges of the receipt 70 are still visible to the customer because they protrude at either side of the slot 22b. This occurs because of the canopy 48, which prevents the customer from placing his/her finger 60 directly on the slot 22b.

On prior art ATMs, if a customer covered the receipt printer slot with his/her finger, then because of the gap between the receipt printer and the part of the fascia defining the receipt printer slot (similar to the gap shown in FIG. 7 by double headed arrow 90), the receipt would be forced down that gap, eventually leading to a receipt paper jam in the receipt printer. This necessitated dispatch of an ATM technician to clear the jam.

In contrast to the prior art, it will now be appreciated that because of the arrangement of the canopy 48 and the protrusion 50 in the above embodiment, even if the customer places a finger 60 on the protrusion 50, opposing edges of the receipt 70 still exit a sufficient distance from the slot 22b to allow the receipt 70 to be visible to, and removed by, the customer. This greatly reduces the number of visits by an ATM technician to clear receipt paper jams.

Various modifications may be made to the above described embodiment within the scope of the invention, for example, in other embodiments, the self-service terminal may be a kiosk, such as a check-in and/or check-out kiosk, or any other type of self-service terminal.

In other embodiments, the profile of the protrusion 50 may differ from that shown, for example, the lower surface may be contoured (for example, with a concave profile) to complement a human finger.

In other embodiments, instead of mounting an insert onto a fascia, the fascia may be molded as an integral unit without any inserts, so that the formations provided on the insert in the above embodiment (or other convenient formations) would be molded directly onto the fascia.

In other embodiments, the receipt may be for a transaction other than a financial transaction.

In other embodiments, the canopy may extend outwardly from the aperture a greater distance at the centre of the aperture than at either side of the aperture, thereby ensuring that edges of a receipt are visible even if the central portion of the aperture is blocked, for example, by a customer's finger.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A self-service terminal comprising a fascia defining an aperture through which a receipt is dispensed to a customer, the fascia comprising a protrusion located immediately beneath the aperture in a generally central location, the protrusion comprising a lower surface against which a customer's finger may rest and an upper surface for guiding an exiting receipt, the protrusion extending outwardly from the fascia to ensure that even if the customer places a finger on the protrusion, opposing edges of the receipt exit a sufficient distance from the aperture to allow the receipt to be removed by the customer.

2. A terminal according to claim 1, wherein the protrusion comprises a generally arcuate lower surface.

3. A terminal according to claim 1, wherein the protrusion provides a flat upper surface to facilitate transport of the receipt.

4. A terminal according to claim 1, wherein the fascia further comprises a canopy defined above the aperture and arranged to reduce ingress of debris and precipitation into the aperture.

5. A terminal according to claim 4, wherein the canopy and protrusion are arranged such that opposing edges of an exiting receipt are visible even if the customer's finger is located above the protrusion.

6. A terminal according to claim 4, wherein the canopy extends outwardly from the aperture a greater distance at the centre of the aperture than at either side of the aperture, thereby ensuring that edges of a receipt are visible even if the central portion of the aperture is blocked by the customer's finger.

7. A terminal according to claim 1, wherein the self-service terminal includes a cash dispenser.

8. An insert for a self-service terminal fascia, the insert defining an aperture through which a receipt is dispensed to a customer, the insert comprising a protrusion located immediately beneath the aperture in a generally central location, the protrusion comprising a lower surface against which a customer's finger may rest and an upper surface for guiding an exiting receipt, the protrusion extending outwardly from the insert to ensure that even if the customer places a finger on the protrusion, opposing edges of the receipt exit a sufficient distance from the aperture to allow the receipt to be removed by the customer.

9. An insert according to claim 8, wherein the insert is molded from plastics material.

10. A fascia defining an insert aperture, where the insert aperture is adapted to receive an insert according to claim 8.

* * * * *